UNITED STATES PATENT OFFICE.

AUGUST P. BJERREGAARD, OF NEW YORK, N. Y., ASSIGNOR TO CHARLES W. COOPER, OF SAME PLACE.

PROCESS OF IMPARTING DRYING PROPERTIES TO VARNISHES.

SPECIFICATION forming part of Letters Patent No. 629,330, dated July 25, 1899.

Application filed July 21, 1898. Serial No. 686,488. (No specimens.)

*To all whom it may concern:*

Be it known that I, AUGUST P. BJERREGAARD, a citizen of the United States, residing at New York city, State of New York, have invented certain new and useful Improvements in Processes for Imparting Drying Properties to Varnishes, of which the following is a full, clear, and exact description.

My invention relates to a method of treating varnishes (made of copal-gum, fatty drying-oil, and a thinning agent) with other substances which shall cause the same to receive additional drying properties.

In processes of making gum and fatty-oil varnishes heretofore employed the driers used are usually either first heated with the oil at a high temperature before the oil is added to the gum or the driers are boiled simultaneously with the oil and the gum, an operation requiring high temperature. In the manufacture of certain varnishes it is preferable to use oil which has not been previously boiled, because a varnish made of such unboiled oil is more lasting than one in which previously-boiled oil is used, and therefore any treatment for adding drying agents to the oil in which the oil is boiled in advance would be objectionable, and it has been my experience that when the drier is boiled with the oil or with both the gum and the oil the results are not always satisfactory, and a greater quantity of the drier has to be used than is necessary in my process hereinafter described.

The less the oil that enters into the composition of a varnish has been subjected to heat the more elastic and lasting is the varnish. Therefore the ability to make a good drying-varnish with the use of a large proportion of unboiled oil is an advantage.

I have found that by my process drying properties can be added to varnishes made of fatty drying-oil and copal after the same have been completed by the incorporation by heat of the gum with the oil, after they have been thinned with a suitable agent, and preferably after they have become comparatively or entirely cool. I may also by my process add an excess of drying properties to varnishes made of fatty drying-oil and copal, and thereby fit them for use as driers for other kindred varnishes.

In the preferred manner of carrying out my process I add to the previously boiled and cooled varnish (after thinning it with a suitable agent and when said varnish is at any temperature below the boiling-point of the said agent, and preferably at ordinary atmospheric temperature) a small quantity of an oxid of a metal, preferably the oxid of lead, known as "litharge"—say about one-tenth of one per cent. thereof, more or less. I also add borate of manganese, sulfate of manganese, or other suitable manganese salt in quantity preferably about one chemical equivalent for each chemical equivalent of the lead oxid used. I then suitably agitate the mixture until the drying property of the varnish is sufficiently developed. This may take several hours, depending upon the amount of driers added, the characteristics of the varnish acted upon, and the manner of agitating the mass. The lead oxid, together with the manganese salt, may be added together to the varnish, or either may be added first and the other afterward. While it is preferable to use the lead oxid and the manganese salt in equal molecular proportions—for example, in the ratio of two hundred and nineteen pounds oxid of lead to one hundred and ninety-five pounds commercial precipitated borate of manganese—I find it is not absolutely necessary to observe these exact proportions, for if, for instance, an excess of lead oxid is used it will remain in solution in the finished varnish with little, if any, detrimental effect upon it if the excess is not too great, while if an excess of the manganese salt is used it will simply remain undissolved to be subsequently settled or filtered out, together with the insoluble lead salt formed by chemical reaction during the operation. I prefer, however, to avoid using an excess of lead, and in order to prevent any lead remaining in the finished varnish I often use an excess of manganese salt. The amount of lead oxid and manganese salt required in any particular case depends on the kind of varnish operated upon and also upon the drying quality desired in the product. The quicker the product is desired to dry the greater must be the proportion of the drying agents. If the product turns out after treatment by this process to dry too fast, the drying property may be reduced by adding a suitable quantity of untreated varnish. If, on the other hand, it does not dry fast enough, more lead oxid and manganese salt may be added, or there may be added to the product enough of very strongly-drying varnish to give the desired drying quality to the whole.

Apparently the chemical changes involved in this process consist, in the first place, of a combination between the oxid of lead and the varnish, or one or more of its constituents, and then, in the second place, of a double decomposition between the so-formed lead compound and the manganese salt, resulting in the formation of a compound of manganese oxid and the varnish, or one or more of its constituents, and of a salt of lead insoluble in the varnish—as, for example, lead borate when manganese borate is used.

I have made a number of tests to determine the proportions of driers in some of the best-known varnishes on the market, and in all that I have tested I have found the proportions of such driers to be much greater than is required by my process to produce equal drying effects, and as the smaller the quantity of drier in the finished product the more lasting is the varnish the smaller amount of drier required by my process constitutes an advantage consisting partly in the improvement in the quality of the varnish and partly in a saving in the cost of the chemicals used.

As an illustrative example of how I may carry out my process in practical operations the following directions are given: Assuming it is desired to treat an outside body-varnish made (for example, by the process described in my pending application for Letters Patent, Serial No. 644,009, filed July 9, 1897) of kauri, raw linseed-oil, and turpentine in the proportions of sixty pounds of the copal, fifteen gallons of the oil, and twenty-two gallons of the thinning agent, I take, say, one hundred gallons of this varnish and place it in a closed tank fitted with a suitable stirring arrangement. I then add six ounces of litharge and six ounces of commercial borate of manganese and stir the mass for about three or four hours. During the stirring or agitation it is well to provide against such currents of air as would cause a wasteful loss of the thinning agent by evaporation. After this treatment the resulting product will resemble the varnish before being operated upon in all particulars except in its drying properties. Before treatment it might have dried "dust free" in, say, four or five days, whereas after the treatment above described it may dry in ten hours or less.

While this process is applicable to varnishes made with copal and a fatty oil other than a drying-oil and a thinning agent, the same is not made the subject-matter of this application, but is made the subject-matter of another application filed by me, which is a division hereof.

What I claim is—

1. The process of treating a varnish made of copal, fatty drying-oil, and thinning agent, so as to add drying properties thereto, consisting in mixing with the said varnish, at a temperature not above the boiling-point of the thinning agent, driers consisting of an oxid of a suitable metal and a suitable manganese salt, said driers being substantially in the relative proportions set forth; the total weight of driers remaining in solution being less than one-third of one per cent.

2. The process of treating a varnish made of copal, fatty drying-oil, and thinning agent, so as to add drying properties thereto, consisting in mixing with the said varnish, at a temperature not above the boiling-point of the thinning agent, driers consisting of oxid of lead, and a suitable manganese salt, said driers being substantially in the relative proportions set forth; the total weight of driers remaining in solution being less than one-third of one per cent.

Signed at New York, N. Y., this 15th day of July, 1898.

AUGUST P. BJERREGAARD.

Witnesses:
EMERSON R. NEWELL,
L. VREELAND.